United States Patent [19]

Hanssen

[11] Patent Number: 5,751,380
[45] Date of Patent: May 12, 1998

[54] OPTICAL PROTECTION APPARATUS FOR USE WITH NIGHT VISION DEVICES

[75] Inventor: Jeffrey Scott Hanssen, Ventura, Calif.

[73] Assignee: The United States of America as represented by the Secretary of the Navy, Washington, D.C.

[21] Appl. No.: 537,344

[22] Filed: Oct. 2, 1995

[51] Int. Cl.[6] .................................................. G02F 1/13
[52] U.S. Cl. ................................. 349/1; 250/214 VT
[58] Field of Search ................. 250/214 LA, 214 VT; 359/409; 349/1, 2, 13, 14

[56] References Cited

U.S. PATENT DOCUMENTS

| | | | |
|---|---|---|---|
| 4,433,236 | 2/1984 | Shimada | 250/214 VT |
| 4,755,725 | 7/1988 | Kastendieck et al. | 250/214 VT |
| 4,843,229 | 6/1989 | Reed et al. | 250/214 VT |
| 4,853,529 | 8/1989 | Meyers | 250/214 VT |
| 5,118,925 | 6/1992 | Mims et al. | 250/214 VT |
| 5,168,378 | 12/1992 | Black et al. | 359/38 |

FOREIGN PATENT DOCUMENTS

| | | | |
|---|---|---|---|
| 55-166617 | 12/1980 | Japan | 349/1 |
| 57-130012 | 8/1982 | Japan | 349/1 |
| 61-180218 | 8/1986 | Japan | 349/1 |

Primary Examiner—William L. Sikes
Assistant Examiner—James A. Dudek
Attorney, Agent, or Firm—Melvin J. Sliwka; David S. Kalmbaugh

[57] ABSTRACT

An optical protection apparatus for preventing the degradation by bright light of the performance of night vision devices which includes a first lens for focusing bright light from a light source onto a charge coupled device sensing array at its focal plane. Simultaneously, light from the source is imaged onto a liquid crystal television display which is positioned in front of the optical image sensing element for the night vision goggles. Raster scan and data processing circuit a first stream of digital data which represents the bright light image focused onto the charge coupled device sensing array. A video contrast enhancer generates a second stream of digital data which represents a negative image of the bright light image. This second stream of digital data is supplied to an electronics control module which generates alternating current drive signals for forming an opaque image on the liquid crystal television display at the position on the liquid crystal television display upon which the bright light image is incident. This opaque image prevents the bright light image from passing through the liquid crystal television display to the optical image sensing element for the night vision device.

9 Claims, 1 Drawing Sheet

© 1
OPTICAL PROTECTION APPARATUS FOR USE WITH NIGHT VISION DEVICES

BACKGROUND OF THE INVENTION

1. Field of the Invention

The present invention relates generally to an apparatus for protecting night vision devices from laser energy and other sources radiant energy. More specifically, the present invention relates to an optical or sensor protection apparatus adapted for use with a night vision device which does not interrupt the normal light energy to the night vision device or the eyes of the receiver.

2. Description of the Prior Art

Many state of the art military systems rely on sensitive optical detectors for gathering information. Night vision goggles or other night vision optical devices adapted for use by the human eye to gather information at night is an example of such equipment. With this new state of the art equipment new problems have developed.

One such problem is that the equipment, including night vision goggles, will suffer degraded imaging performance from bright sources that operate in the detector's band range. In extreme cases, light sources may be bright enough to cause damage to the night vision devices.

Examples of such bright light sources are fires and flares that commonly occur in a night time battlefield environment or a weapon using lasers which operate in a night time hostile environment. Protection against these bright light sources has been less than adequate. For example, an automatic gain control circuit has been used with night vision devices to reduce the intensity of bright light, however, this automatic gain control circuit also degrades the image being observed over the entire field of view. In the case of laser light, for example, filters and filtering networks have been used to exclude the band of wavelengths containing the laser light. Further, shutters have been employed to close off incoming light when it contains a high intensity component.

Filters present a problem in that, for example, the filter may exclude a band of the spectrum being received leading to the reception of incomplete or misleading information. In addition, filters are currently not available which can provide protection against state of the art agile laser weapons which cover an entire range of frequencies. Filters also do provide protection against changing frequency hostile laser weapons and still allow optical input to the receivers.

The use of shutters to eliminate bright light from the field of view generally results in the loss of the entire scene as long as the bright light is present.

Accordingly, there is a need for an apparatus which can provide optimum protection against dangerously intense bright light sources such as a laser without closing the input field. In addition, this protective apparatus should react to any and all frequencies of high intensity energy.

SUMMARY OF THE INVENTION

The present invention overcomes some of the disadvantages of the prior art including those mentioned above in that it comprises a relatively simple yet highly efficient and accurate optical protection apparatus for use with night vision goggles and other bright light sensitive equipment. The optical protection apparatus includes a first lens for focusing bright light from a source, such as a laser, onto a charge coupled device sensing array at its focal plane. Simultaneously, light from the source is imaged onto a liquid crystal television display which is positioned in front of the optical image sensing element for the night vision devices. Raster scan and data processing circuit connected to the charge coupled device sensing array provides a first stream of digital data which represents the bright light image focused onto the charge coupled device sensing array. A video contrast enhancer coupled to the raster scan and data processing circuit generates a second stream of digital data which represents a negative image of the bright light image. This second stream of digital data is supplied to an electronics control module which generates alternating current drive signals for forming an opaque image on the liquid crystal television display at the position on the liquid crystal television display upon which the bright light image is incident. This opaque image prevents the bright light image from passing through the liquid crystal television display to the optical image sensing element for the night vision devices and thereby prevents damage or degraded performance of the night vision devices.

DETAILED DESCRIPTION OF THE PREFERRED EMBODIMENT

Figure 1:
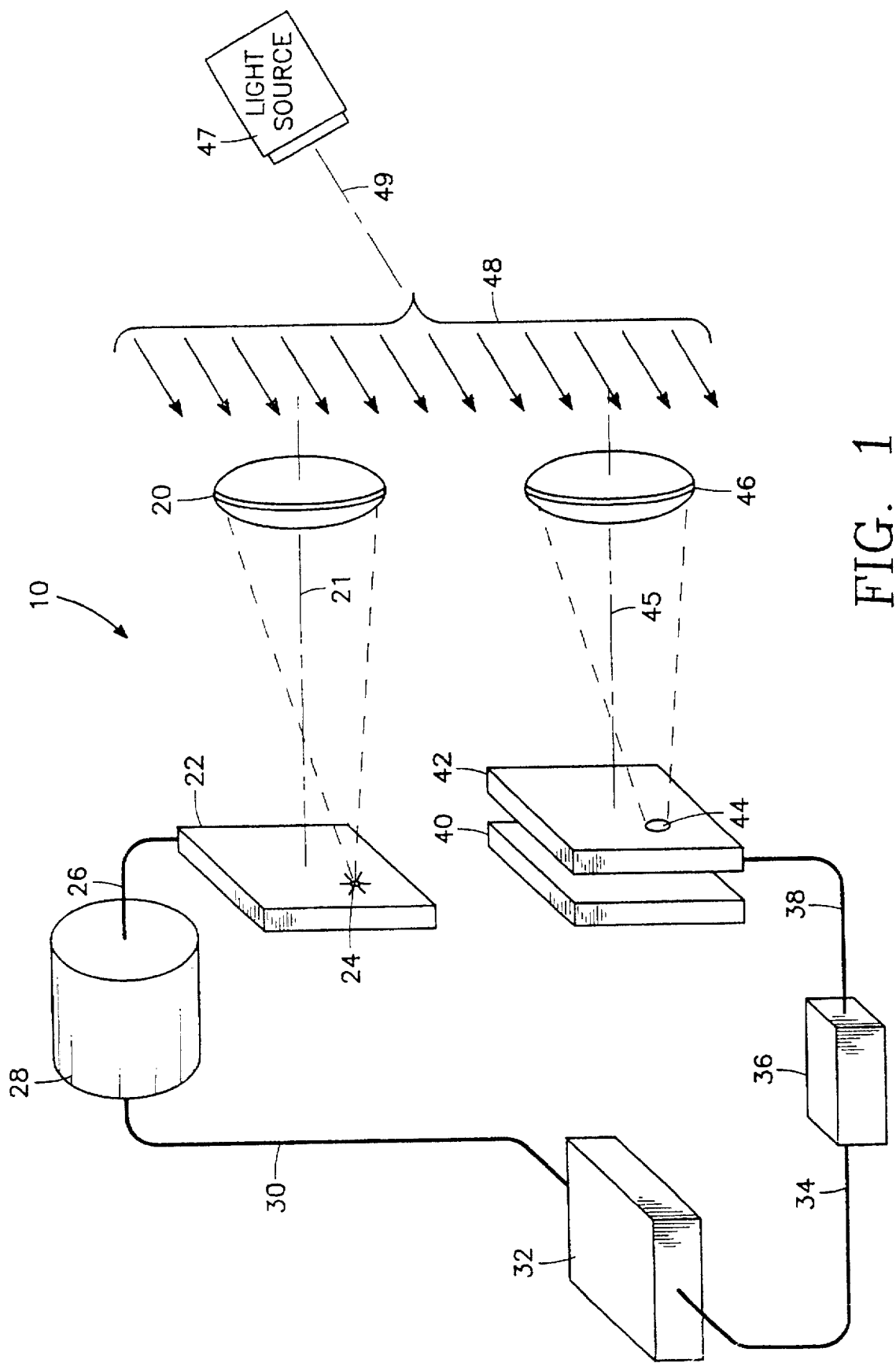
FIG. 1 is an optical schematic diagram of the optical protection apparatus constituting the present invention.

Referring to FIG. 1, the reference numeral 10 designates generally the preferred embodiment of an optical protection apparatus adapted for use with night vision goggles or other light sensitive image receiving devices. Light energy 48 from a light source 47 is projected along an optical path 49 toward optical protection apparatus 10. Light source 47 may be any source of source of light energy which highly intense and capable of inflicting severe damage on light sensitive equipment such as a collimated beam of laser light energy. Other sources of highly intense light energy include flares, fires and the explosion of ordinance.

The light energy 48 projected by light source 47 is received by a pair of input object lenses 20 and 21 which are positioned downstream from source along optical path 49. Input object lens 20 is, in turn, positioned adjacent input object lens 21 with a close distance of only a few millimeters (2–100 millimeters) separating lens 20 from lens 21. The lenses used in the preferred 20 and 21 used in the preferred embodiment are Cinegon lenses, 16 millimeter, f/1.4 commercially available from Schneider Corporation of America of Woodbury, N.Y.

There is positioned downstream from lens 20 at the focal plane of lens 20 along an optical axis 21 a charge coupled device sensing array 22 having a plurality of photodetecting elements. The light energy 48 received by lens 20 is focused by lens 20 upon a spot or location 24 on the charge coupled device sensing array 22 to form a bright light/spot image.

There is positioned downstream from lens 46 at the focal plane of lens 46 along an optical axis 45 a liquid crystal television display 42. The light energy 48 received by lens 46 is focused by lens 46 upon a spot or location 44 on the liquid crystal television display 42 to form a bright light/spot image.

There is electrically coupled to charge coupled device sensing array 22 by an electrical cable 26 a raster scan and data processing circuit 8. The bright light image 24 formed upon array 22 is divided into small regions often referred to as picture elements or "pixels". Each photodetecting element of array 22 represents a pixel. Raster scan and data processing circuit 28 parallel horizontally scans or raster scans the photodetector elements of array 22. At each pixel location on array 22 the image is sampled and quantized by data processing circuit 28. This, in turn, generates a digitized integer at each pixel location (referred to as the gray level) resulting in a first stream of digital data which represents bright light image 24.

At this time it should be noted that a Fairchild Model CAM 30001 Charge Coupled Device Camera commercially available from Fairchild Weston Systems Inc. of Sunnyvale, Calif. was utilized as charge coupled device sensing array 22 and raster scan and data processing circuit 28.

Data processing circuit 28 supplies this first stream of digital data representing bright light image 24 to a video contrast enhancer 32 via an electrical cable 30. Video contrast enhancer 32 has an inversion function which generates a negative image of bright light image 24, that is a white-to-black reversal of bright light image 24.

At this time it should be noted that a Video Contrast Enhancer Model 605 manufactured by Colorado Video of Boulder, Colo. can be utilized as video contrast enhancer 32 in the preferred embodiment of the present invention. Further, a Dual Channel Time Base Corrector, Model AH91 manufactured by Hotronic Inc. of Campbell, Calif. can also function as video contrast enhancer 32 since this device has negative imaging capabilities.

Enhancer 32 is electrically coupled by an electrical cable 34 to the electronics control module 36 of liquid crystal television display 42. A separate electrical cable 38 electrically couples electronics control module 36 to liquid crystal television display 42. Enhancer 32 supplies a second stream of digital data to module 36 representative of the negative image of bright light image 24. Electronics control module 36 then generates the alternating current drive signals for forming a dark spot image or opaque image at location 44 on the liquid crystal television display 42.

Positioned directly behind liquid crystal television display 42 along optical axis 45 is the optical image sensing element 40 for night vision goggles or other night vision devices which utilized an optical image sensing element. Liquid crystal television display is normally transparent to low level incoming light allowing the user of the night vision goggles to observe the surrounding environment which the user currently occupies. The dark spot formed on liquid crystal television display 42 protects the focal plane of optical image sensing element 40 from the intensity of the light energy 48 provided by source 47.

The position of the dark spot image 44 on liquid crystal television display 42 is identical to the position of the bright spot image 24 on charge coupled device sensing array 22. When light source 47 is moved to a different location lens 20 will focus the light energy 48 generated by light source 47 onto a different location on array 22 resulting in the generation of a dark spot image at a different location on display 42. Lens 46 will then focus the light energy 48 generated by light source 47 onto the dark spot image formed on display 42, however, the light energy 48 does not pass through display 42 because of the presence of the dark spot image formed on display 42. Since the remainder of display 42 remains clear, the scene surrounding light energy 48 from light source 47 will remain visible to the user of the night vision devices such as night vision goggles.

Optical protection apparatus 10 is designed for use with night vision devices such as the night vision goggles used by the military and law enforcement agencies. For example, apparatus 10 is adapted for use with the AN/PVS-7 single tube night vision goggle, the ANVIS night twin-tube goggle and the AN/VVS-2 and AN/VVS-501 tank driver's viewer manufactured by Electro-Optical Systems of Garland, Tex.

It should be noted that a liquid crystal television monitor, Model LCTV, commercially available from Radio Shack, a division of Tandy Corporation of Fort Worth, Tex. was used as electronics control module 36 and liquid crystal television display 42. It should be understood by those skilled in the art that any addressable liquid crystal imaging matrix or system which matches the spectral range of night vision devices such as night vision goggles may be used as electronics control module 36 and liquid crystal television display 42 in the preferred embodiment of the present invention.

From the foregoing it may readily be seen that the present invention comprises a new, unique, and exceedingly useful optical protection apparatus for use with night vision goggles and the like which constitutes a considerable improvement over the known prior arts. Obviously, many modifications and variations of the present invention are possible in light of the above teachings. It is therefore, to be understood that within the scope of the appended claims the invention may be practiced otherwise than as specifically described.

What is claimed is:

1. An optical protection apparatus for protecting an optical image sensing element of a night vision device from a light source, said optical protection apparatus comprising:

first and second lens means spatially disposed from said light source along an optical path from said light source, said first and second lens means collecting and focusing light energy from said light source;

a sensing array spatially disposed from said first lens means at a focal plane of said first lens means along a first optical axis;

said first lens means collecting and focusing said light energy from said light source onto said sensing array means forming a spot of light energy on said sensing array means;

said sensing array generating a first stream of digital data representative of the spot of light energy formed on said sensing array means;

image inverting means coupled to said sensing array for receiving said first stream of digital data, said image inverting means processing said first stream of digital data to form a negative image of said spot of light energy, said image inverting means generating a second stream of digital data representative of the negative image of said first light spot;

an optical display spatially disposed from said second lens means at a focal plane of said second lens means along a second optical axis, said optical display being positioned directly in front of said optical image sensing element;

said second lens means collecting and focusing said light energy from said light source onto said optical display;

control circuit means coupled to said image inverting means and said optical display for receiving said second stream of digital data from said image inverting means, said control circuit means, responsive to said second stream of digital data, providing electrical drive signals to said optical display to form an opaque image on said optical display;

said opaque image being formed on said optical display at a location on said optical display to prevent said light energy from passing through said optical display to said optical image sensing element of said night vision device.

2. The optical protection apparatus of claim 1 wherein said first and second lens means each comprise a 16 millimeter, f/1.4 lens wherein f is the focal length of said lens.

3. The optical protection apparatus of claim 1 wherein said sensing array comprises:
  a charge coupled device sensing array spatially disposed from said first lens means at said focal plane of said first lens means along said first optical axis; and
  a raster scan and data processing circuit coupled to said charge coupled device sensing array.

4. The optical protection apparatus of claim 1 wherein said image inverting means comprises a video contrast enhancer.

5. The optical protection apparatus of claim 1 wherein said image inverting means comprises a dual channel time base corrector.

6. The optical protection apparatus of claim 1 wherein said optical display comprises a liquid crystal television display.

7. An optical protection apparatus for protecting an optical image sensing element of a night vision device from a light source, said optical protection apparatus comprising:
  first and second lens spatially disposed from said light source along an optical path from said light source;
  a charge coupled device sensing array spatially disposed from said first lens at a focal plane of said first lens along a first optical axis;
  said first lens collecting and focusing light energy from said light source onto said charge coupled device sensing array forming a spot of light energy on said charge coupled device sensing array;
  a raster scan and data processing circuit coupled to said charge coupled device sensing array for generating a first stream of digital data representative of the spot of light energy formed on said charge coupled device sensing array;
  a video contrast enhancer coupled to said raster scan and data processing circuit to receive said first stream of digital data;
  said video contrast enhancer processing said first stream of digital data to form a negative image of said spot of light energy, said video contrast enhancer generating a second stream of digital data representative of the negative image of said first light spot;
  a liquid crystal television display spatially disposed from said second lens at a focal plane of said second lens along a second optical axis, said liquid crystal television display being positioned directly in front of said optical image sensing element;
  said second lens collecting and focusing said light energy from said light source onto said liquid crystal television display; and
  an electronics control module coupled to said video contrast enhancer and said liquid crystal television display for receiving said second stream of digital data from said video contrast enhancer, said electronics control module, responsive to said second stream of digital data, providing electrical drive signals to said liquid crystal television display to form an opaque image on said liquid crystal television display;
  said opaque image being formed on said liquid crystal television display at a location on said liquid crystal television display to prevent said light energy from passing through said liquid crystal television display to said optical image sensing element of said night vision device.

8. The optical protection apparatus of claim 7 wherein said first and second lens means each comprise a 16 millimeter, f/1.4 lens wherein f is the focal length of said lens.

9. The optical protection apparatus of claim 7 wherein said video contrast enhancer comprises a dual channel time base corrector.

* * * * *